United States Patent [19] [11] 3,719,742
Terrana et al. [45] March 6, 1973

[54] PROCESS FOR THE REMOVAL OF SULFUR DIOXIDE FROM A SULFUR DIOXIDE-CONTAINING GAS

[75] Inventors: Jack D. Terrana, Tampa; Leo A. Miller, Lakeland, both of Fla.

[73] Assignee: Wellman-Lord, Inc., Lakeland, Fla.

[22] Filed: July 23, 1970

[21] Appl. No.: 57,824

Related U.S. Application Data

[63] Continuation-in-part of Ser. No. 773,344, Nov. 4, 1968, abandoned.

[52] U.S. Cl. ................................. 423/242, 423/574
[51] Int. Cl. ....................... C01b 17/04, C01b 17/60
[58] Field of Search .......... 23/25, 25 Q, 63, 130, 137, 23/178, 178 S, 181, 225, 226

[56] References Cited

UNITED STATES PATENTS

| | | | |
|---|---|---|---|
| 616,391 | 12/1898 | De Baranoff et al. | 23/134 X |
| 2,177,707 | 10/1939 | Gaither | 23/130 |
| 2,245,697 | 6/1941 | Mclendy | 23/130 |
| 3,129,058 | 4/1964 | White et al. | 23/137 |
| 3,438,727 | 4/1969 | Heredy | 23/181 |
| 3,438,728 | 4/1969 | Grantham | 23/181 |

OTHER PUBLICATIONS

Kraus et al., Chem Abs., Vol. 64, p. 15438(a) (1966)

Primary Examiner—Earl C. Thomas
Assistant Examiner—Charles B. Rodman
Attorney—Morton, Bernard, Brown, Roberts & Sutherland

[57] ABSTRACT

A process for treating metal pyrosulfites such as potassium, cesium, and rubidium pyrosulfites to obtain the corresponding metal sulfide therefrom is disclosed, particularly in a system where the pyrosulfite is obtained as a result of reacting $SO_2$-containing gases with an aqueous absorbing solution of the corresponding metal sulfite to produce a spent absorbing solution containing dissolved metal bisulfite, and then recovering the metal bisulfite therefrom in the form of the corresponding metal pyrosulfite (e.g., by cooling the spent absorbing solution to crystallize out the pyrosulfite). The process involves heating the pyrosulfite in the presence of a reducing agent such as carbon, carbon monoxide, hydrogen, hydrogen sulfide, or their mixtures to convert the pyrosulfite to the corresponding metal sulfide. The metal sulfide may then be reacted with water and $CO_2$ to form the corresponding metal carbonate (which can be recycled to the $SO_2$ absorbing solution) and $H_2S$. The $H_2S$ from the latter step can be mixed with $SO_2$ and the mixture subjected to the Claus reaction to produce elemental sulfur and water.

12 Claims, No Drawings

PROCESS FOR THE REMOVAL OF SULFUR DIOXIDE FROM A SULFUR DIOXIDE-CONTAINING GAS

This application is a continuation-in-part of application Ser. No. 773,344, filed Nov. 4, 1968 now abandoned.

The present invention relates to a process for reducing metal pyrosulfite to produce the corresponding metal sulfide, particularly in an $SO_2$ recovery process wherein $SO_2$ is absorbed from an $SO_2$-containing gas with an aqueous solution of a metal sulfite, thereby forming an aqueous solution of the corresponding metal bisulfite (an $SO_2$ precursor), the $SO_2$ precursor then being recovered from the solution, and then being treated to recover therefrom the sulfur values which were obtained from the $SO_2$-containing gas and to regenerate a metal compound which can react with and absorb $SO_2$ from a gas containing same and, therefore, be recylced to the $SO_2$ absorption step.

In accordance with the present invention, the metal pyrosulfite is treated to recover the absorbed sulfur values therefrom by chemical reduction of the pyrosulfite to the corresponding metal sulfide and, in one embodiment, thereafter reacting the sulfide with water and $CO_2$ to form the corresponding metal carbonate and $H_2S$. The term "metal sulfide" is used herein to embrace monosulfides as well as polysulfides and mixtures of sulfides. For example, "potassium sulfide" is intended to mean any one, or a mixture of two or more, of $K_2S$, $K_2S_2$, $K_2S_3$, $K_2S_4$ and $K_2S_5$.

Other embodiments of the present invention involve the subjection of the $H_2S$ obtained as mentioned above to the Claus reaction with $SO_2$ whereby these reactants are converted to elemental sulfur and water; and also involve incorporating the metal carbonate as makeup in the metal sulfite solution used in the $SO_2$ absorption step. The treating of the metal pyrosulfite to recover the absorbed sulfur values therefrom by the process of the present invention involves contacting the metal pyrosulfite at reduction temperatures with a reducing agent which is effective to remove all of the oxygen atoms from the pyrosulfite molecule, thereby reducing the pyrosulfite to the corresponding metal sulfide. As suitable such reducing agents may be mentioned carbon, carbon monoxide, hydrogen, hydrogen sulfide, and mixtures of the foregoing.

In particular, this invention can be advantageously integrated with the systems disclosed in copending applications Ser. Nos. 616,682, filed Feb. 16, 1967, and 681,680, filed Nov. 9, 1967, Miller et al., both of said applications now abandoned and being herein incorporated by reference. These applications disclose a process for treating $SO_2$-containing gases — especially waste gases such as smelter gases, off gases from many chemical plants, and stack or furnace gases from coal-burning furnaces such as used in electric power plants — with an aqueous solution of metal sulfite, e.g., potassium, cesium, or rubidium sulfite, to absorb the $SO_2$ therefrom and form a spent absorbing solution containing the corresponding metal bisulfite. In this process, using an aqueous solution of potassium sulfite as an example but not as a limitation, the principal reaction in the $SO_2$ absorption zone proceeds as follows:

(1) $K_2SO_3 + H_2O + SO_2 \rightarrow 2KHSO_3$ 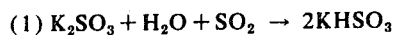

The spent solution generally contains the following ingredients:

|  | Weight percent range | |
| --- | --- | --- |
|  | Generally | Usually |
| Metal sulfate | 0 to 8 | 1 to 6 |
| Metal bisulfite | 5 to 40 | 10 to 30 |
| Metal sulfite | 10 to 50 | 20 to 45 |
| Water | Balance | Balance |

As a first step toward recovering the $SO_2$ from the spent absorbing solution, the latter can be treated to recover the metal bisulfite therefrom in the form of the corresponding metal pyrosulfite. Such recovery can be accomplished, for instance, by selectively extracting the metal bisulfite from the solution or by selectively extracting the other ingredients therefrom, and, either in the same operation or as a separate step, transforming the metal bisulfite to he corresponding metal pyrosulfite. In one embodiment of the present invention, such recovery can be accomplished, for example, by crystallizing the metal bisulfite (which transforms to the metal pyrosulfite during crystallization) out of solution. Again using potassium bisulfite as an example, the reaction proceeds as follows:

(2) $2KHSO_3 \underset{cool}{\rightarrow} K_2S_2O_5 \downarrow + H_2O$ 

As discussed in the above-mentioned applications, the resulting metal pyrosulfite, after separation from its supernatant, or mother, liquor, which liquor usually contains significant amounts of $SO_2$ partial pressure-lowering materials such as the corresponding metal sulfite, can be thermally decomposed to evolve $SO_2$ and regenerate the metal sulfite which can be used in the initial $SO_2$ absorption step. In the case of the potassium pyrosulfite the reaction theoretically proceeds as follows:

(3) $K_2S_2O_5 \underset{heat}{\rightarrow} K_2SO_3 + SO_2$ 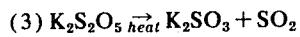

However, in decomposing the pyrosulfite as described above, a second reaction, called "disproportionation," can occur simultaneously with the thermal decomposition of the pyrosulfite. These reactions can occur as follows: (4) Thermal decomposition: $3K_2S_2O_5$ 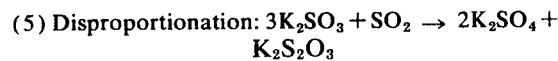 $\overset{heat}{\rightarrow} 3K_2SO_3 + 3SO_2$ (5) Disproportionation: $3K_2SO_3 + SO_2 \rightarrow 2K_2SO_4 + K_2S_2O_3$ As can be seen, there can be a total loss of metal sulfite solution for recycle to the absorber. In addition, one-third of the relatively pure $SO_2$ product, a valuable product, can be lost through he disproportionation reaction.

By employment of the chemical reduction process of the present invention to convert the pyrosulfite to the corresponding metal sulfide, a substantial improvement over the above, thermal decomposition method can be realized. A savings in energy requirements, for instance, is obtained. In addition, when subjecting the metal sulfide to reaction with $CO_2$ and water to produce the corresponding metal carbonate and hydrogen sulfide, in one embodiment of the present invention, there can be obtained two moles of sulfur from each mole of the pyrosulfite, as compared to a theoretical yield of approximately 0.66 mole obtained by the above described thermal decomposition of the pyrosulfite. (Actual laboratory yields are about 0.33 mole.)

As indicated above, the process of the present invention for treating the metal pyrosulfite to recover absorbed sulfur values therefrom involves contacting the metal pyrosulfite with a reducing agent such as carbon, carbon monoxide, hydrogen, hydrogen sulfide, or mixtures thereof, at a temperature sufficient to reduce the pyrosulfite to the corresponding metal sulfide, e.g., in the range of about 1,200 to 1,800° F.

Atmospheric, as well as sub- and super-atmospheric, pressures can be employed in the reduction zone. Ambient pressure conditions are preferred, however, for economic reasons. Suitable residence times for the pyrosulfite in the reduction zone will vary with different reactants, temperatures, etc., but good reduction is often obtained with a residence time of at least about 30 minutes, and some improvement is frequently noted when extending the time to 45 minutes. These observations are particularly true when employing reduction zone temperatures of about 1,560° F. or higher.

When carbon is employed as the reducing agent it may be preferred to maintain a reduction zone temperature of about 1,700°–1,800° F., since in this temperature range the production of $SO_2$ as gaseous overhead from the reduction zone is minimized and the production of the metal sulfide is maximized. At lower temperatures, for example about 1400°–1650° F., $SO_2$ is also a substantial product of the reduction reaction. In the embodiment of the present invention in which the metal sulfide is converted to $H_2S$ and the latter is then reacted with $SO_2$ to form elemental sulfur, the $SO_2$ produced in the reduction reaction can be used as a source of that reactant in the Claus reaction with the $H_2S$. It is usually advisable, however, especially when carbon, e.g., coal or coke, is used as the reducing agent, to remove entrained particulate solids from any $SO_2$-containing overhead from the reduction zone before sending it to a Claus reactor, as these solids have a tendency to quickly foul the catalyst used in the Claus reaction.

The amount of reducing agent used in the reduction is advantageously at least the amount stoichiometrically required to reduce all of the metal pyrosulfite, and preferably at least about a 10 percent excess over stoichiometric. In the embodiment of the present process wherein a reducing agent is employed which exists as a solid at the reduction zone temperatures, it has been found that the use of a large excess, say at least about 5 times stoichiometric, of the solid reducing agent will provide a solid reduction zone product which is generally easier to handle than a molten product. When using coal or coke, for example, this advantage is generally gained by employing about one-half part, or more, say about one-half to two parts, of coal, which represent large excesses over stoichiometric, per part by weight of the metal pyrosulfite.

Any suitable source of carbon may be employed, e.g., coal or coke, charcoal, and hydrocarbons which will decompose at the reduction zone temperatures to produce carbon in situ, for instance petroleum pitch. Hydrogen will also be produced when employing coking-type hydrocarbons as an in situ source of carbon, and both reducing agents will enter into the reaction to reduce the pyrosulfite to the sulfide. The preferred carbon source, for economic reasons, is coke, e.g., coked bunker coal or petroleum coke. Coking of coal to remove volatiles can be accomplished, for example, by heating the coal to about 1,200° to 1,400° F. for, say, at least about 10 minutes.

In the reduction of the metal pyrosulfite a series of reactions is believed to occur. In the case of potassium pyrosulfite and carbon, for example, at a reduction zone temperature of about 1,400°–1,650° F., the reactions can be illustrated as follows:

(6)    $3K_2S_2O_5 \longrightarrow 3K_2SO_3 + 3SO_2$
         (potassium      (potassium
         pyrosulfite)     sulfite)

(7)    $3K_2SO_3 + SO_2 \longrightarrow 2K_2SO_4 + K_2S_2O_3$
                             (potassium    (potassium
                             sulfate)       thiosulfate)

(8)    $2K_2SO_4 + K_2S_2O_3 + 6C \longrightarrow 3K_2S + S$
                                                 (potassium
                                                 sulfide)
                                            $+ 5CO_2 + CO$ Summation of the above reactions provides the following overall equation:

(9)    $3K_2S_2O_5 + 6C \xrightarrow{heat} 3K_2S + 2SO_2 + S + 5CO_2 + CO$

Use of carbon reducing agent at higher reduction zone temperatures, e.g., about 1,700° to 1,800° F., can result in substantially complete conversion of the pyrosulfite to carbon oxides and potassium sulfide. The reactions there involved can be illustrated as follows:

(10)    $K_2S_2O_5 + 2C \rightarrow K_2S + SO_2 + CO_2 + CO$

(11)    $C + SO_2 \rightarrow CO_2 + S$

(12)    $S + K_2S \rightarrow K_2S_2$

Summation of these reactions provides the following overall equation:

(13)    $K_2S_2O_5 + 3C \rightarrow K_2S_2 + 2CO_2 + CO$

As hereinbefore indicated, this higher temperature, carbonaceous reduction of the pyrosulfite provides an advantage over the use of lower reduction zone temperatures in that little or no $SO_2$ is evolved from the reduction zone. Where a carbon source such as coal or coke is used, the overhead vapors from the reduction zone can contain a significant amount of particulate matter such as fly ash. When a substantial amount of $SO_2$ is also present in such an overhead and it is desired to recover or react the $SO_2$, the presence of the solid contaminants can pose a significant problem. If, for example, it is desired to route the $SO_2$ to another reaction zone and then react it with $H_2S$ according to the Claus reaction, so as to produce elemental sulfur and water, the solid contaminants in the $SO_2$ stream can, within a relatively short period of time, foul and deactivate any catalyst which might be used in the Claus reaction. (As herein discussed, for example, it is often preferred to run the Claus reaction using a fixed bed of catalytically-active alumina.) While the entrained particulate matter can be removed from the $SO_2$-containing overhead exiting the reduction zone, the cost of doing so effectively is economically undesirable. On the other hand, by using the higher reduction zone temperatures, e.g., 1,700°–1,800°F., substantially all of the sulfur values in the reduction zone are removed as bottoms in sulfide form. The sulfide can then be converted to $H_2S$ which is not contaminated with fly ash and such, and, if it is still desired to produce elemental sulfur, a portion of the $H_2S$, as also explained herein, can be burned to produce an ashless $SO_2$ stream for use in the Claus reaction.

Another advantage resulting when the 1,700–1,800°F. reduction temperatures are used with a carbonaceous reducing agent is that the formation of tar, which can plug a reactor, is substantially avoided at the higher temperatures.

When using a solid reducing agent such as carbon, it is preferable to pre-admix the metal pyrosulfite and the solid reducing agent, e.g., coal or coke, before subjecting them to the reduction zone temperatures. Such pre-admixing can be accomplished, for example, in a screw pug mill. The solid reducing agent, e.g., coal or coke, may advantageously be provided in a particle size of about 10 to 200 mesh (U.S. Sieve Series) preferably about 25, or even 50, to 100 mesh. The metal pyrosulfite may also be advantageously supplied to the process in the foregoing particle size ranges. It can be advantageous to briquette or pelletize an admixture of the pyrosulfite and the solid reducing agent prior to introducing same to the reduction zone. Briquette sizes may range, for instance, from about 1 to 2, preferably about 1.3 to 1.7, inches in longest dimension, and about 0.8 to 1.4, preferably about 1 to 1.2, inches in shortest dimension.

A surprising discovery has been made with regard to forming briquettes of petroleum coke and potassium pyrosulfite. That is, that a specific order of mixing those two components with water must be followed in order to briquette the mixture effectively. The required mixing order involves (a) thoroughly mixing petroleum coke with water in an amount sufficient to provide about 1.5 to 3.5 percent water, based on the total weight of the eventual coke-pyrosulfite-water mixture, (b) adding the pyrosulfite to the coke and water mixture, and (c) thoroughly mixing the coke, water and pyrosulfite. The resultant mixture can be readily briquetted. Such is not the case, however, if the coke is added to a mixture of the pyrosulfite and water, or if the water is added to a mixture of the pyrosulfite and coke.

Any suitable source of carbon monoxide, hydrogen or hydrogen sulfide can be employed as the reducing agent. Such agents are referred to herein as gaseous reducing agents since, when heated to the reduction zone temperatures, they will be in the gaseous state. An industrial gas containing mixtures of two or more of the foregoing is preferred for economic reasons. Thus, for example, gaseous mixtures containing hydrogen and carbon monoxide, such as reformer gas and water gas, are often preferred. A typical analysis of a suitable reformer gas, for instance, is as follows:

REFORMER GAS COMPOSITION

| Component | Mol Percent |
|---|---|
| Water | 56.52 |
| Hydrogen | 32.98 |
| Carbon dioxide | 5.88 |
| Carbon monoxide | 3.48 |
| Methane | 1.14 |

A suitable source of $H_2S$, should it be employed as the reducing agent, when using one embodiment of the present invention, is the overhead gas stream evolving from the reaction of the metal sulfide with water and carbon dioxide, hereinafter discussed in more detail.

The reduction of the metal pyrosulfite (again using potassium pyrosulfite as an example) with carbon monoxide, hydrogen, or hydrogen sulfide proceeds, much as in the case with carbon at temperatures below about 1,700° F., to yield the following overall equations:

(14) $3 K_2S_2O_5 + 11CO \xrightarrow{heat} 3K_2S + 2SO_2 + S + 11CO_2$

(15) $3 K_2S_2O_5 + 12H_2 \xrightarrow{heat} 3K_2S + 2SO_2 + H_2S + 11H_2O$

(16) $K_2S_2O_5 + 3H_2S \xrightarrow{heat} K_2S + SO_2 + 3S + 3H_2O$

Where a gaseous reducing agent is employed, pre-admixing thereof with the pyrosulfite offers no particular advantage. Counter-current contacting of the pyrosulfite and the reducing gas is preferred, however. For example, the pyrosulfite may advantageously be introduced at the top of a shaft furnace while the reducing gas is fed into the bottom; product gas would then be removed as overhead and the metal sulfide removed as bottoms.

The metal pyrosulfite employed in the reduction step is usually fairly crude when it is obtained from a waste gas absorbing operation; for instance, it will frequently contain significant amounts of the corresponding metal sulfite and sulfate, the latter often being produced by reaction of $SO_3$ in the gases with the metal sulfite of the absorbing solution. Such has been indicated in the earlier discussion herein of the general constituency of a spent $SO_2$ absorbing solution. In addition, there may be formed in situ in the reduction zone minor amounts of sulfates, thiosulfates, trithionates, tetrathionates, and pentathionates. An advantageous feature of the present invention is that the presence of such impurities is generally not detrimental to the process of the invention since, as indicated in the foregoing discussion, they are reduced to the corresponding metal sulfide in the reduction step.

In a preferred embodiment of the present invention, the metal sulfide produced in the reduction zone is recovered, dissolved in water, and the resultant metal sulfide solution reacted with carbon dioxide to produce the corresponding metal carbonate and hydrogen sulfide. There may be elemental sulfur admixed with the metal sulfide product from the reduction zone. Such sulfur is, of course, water-insoluble and can be conveniently recovered by filtering or decanting the aqueous solution of metal sulfide that is to be reacted with the carbon dioxide. Where the reducing agent employed in the conversion of the pyrosulfite to the sulfide is carbonaceous, such as carbon or carbon monoxide, a suitable source of the $CO_2$ may be the off gases from the reduction zone after the $SO_2$ and the sulfur have been removed therefrom. Another suitable source of the $CO_2$ is a $CO_2$-containing gas, e.g., a waste gas such as flue gas, which has been treated with a metal sulfite solution in the manner described above to absorb $SO_2$ therefrom. Also, of course, a completely external source of $CO_2$ can be employed.

Preferably, the metal sulfide solution is filtered to remove insolubles prior to being reacted with the $CO_2$. The $CO_2$ treatment is conducted at a temperature sufficient to convert the metal sulfide to the corresponding metal carbonate. Generally, the temperature will range from about 100° to 225° F., and preferred contacting temperatures are from about 140° to 180° F. Advantageously, the sulfide solution and the $CO_2$ are counter-currently contacted, for example in a vertical column-type reactor wherein the sulfide solution is introduced at the top of the reactor and proceeds downwardly over a series of trays in counter-current flow with gaseous $CO_2$ which is introduced at the bottom of the reactor.

Preferably, at least the stoichiometric amount of $CO_2$ required to convert all of the metal sulfide present in the aqueous solution thereof is employed, and most advantageously at least about a 10 percent excess of $CO_2$ is employed. The reaction proceeds without the presence of catalyst. Atmospheric, sub-, or super-atmospheric pressures may be used; fur economic reasons, however, ambient pressures are preferred. Using potassium sulfide for illustrative purposes, the conversion of the metal sulfide to the corresponding metal carbonate and $H_2S$ proceeds as follows:

(17) $K_2S + H_2O + CO_2 \rightarrow K_2CO_3 + H_2S$

Generally, sufficient water is used when dissolving the metal sulfide to provide an essentially complete solution of the sulfide, and the amount of water will often range from about 2 to about 4 parts of water per part by weight of the metal sulfide.

In a further embodiment of the present invention, the $H_2S$ produced by the reaction of the metal sulfide with water and $CO_2$ is reacted with $SO_2$, for example $SO_2$ produced by the reduction of the metal pyrosulfite, according to the Claus reaction to yield elemental sulfur and water:

(18) $2 H_2S + SO_2 \xrightarrow{heat} 3S + 2 H_2O$

The Claus reaction is advantageously conducted in the presence of water, or it is conducted in the presence of activated alumina as catalyst. Thus, the $H_2S$ and $SO_2$ can be continuously introduced in gaseous state to a reaction vessel filled with water which is maintained at the desired reaction temperature, e.g., about 80° to 200° F., and a slurry of precipitated elemental sulfur in water continuously removed from the bottom of the vessel. Filtration of the slurry yields crystalline sulfur of excellent purity.

When employing activated alumina to catalyze the Claus reaction, the gaseous $H_2S$ and $SO_2$ can advantageously be passed through a fixed bed reactor loaded with activated alumina at a temperature of about 450° to 700° F., preferably about 500° to 600° F. The contacting of the reactants with the catalyst can generally be at a weight hourly space velocity of about 0.1 to 10.

$H_2S$ is highly toxic and it is a particularly undesirable chemical to release to the atmosphere. Accordingly, it is preferred in the process of the present invention that essentially all of the $H_2S$ produced during the conversion of the metal sulfide to the metal carbonate be oxidized to elemental sulfur in the Claus reaction. The $H_2S$ should be reacted with $SO_2$ in as nearly stoichiometric amounts as can practicably be provided. If the supply of $SO_2$ is for some reason inadequate, i.e., less than ½ mole per mole of $H_2S$ available, a portion of the excess $H_2S$ can be oxidized in air, for example at about 1,000° to 1,200° F., to produce additional $SO_2$ and water according to the reaction:

(19) $2H_2S + 3O_2 \xrightarrow{heat} 2SO_2 + 2H_2O$

As indicated earlier, the metal carbonate produced in the optional preferred step of reacting the metal sulfide with water and $CO_2$ is advantageously recycled to the $SO_2$ absorption step. Thus, the metal carbonate can be added, preferably as an aqueous solution, to the rich absorbing solution entering the $SO_2$ absorption zone at the head of the process. The dissolved metal carbonate reacts with the $SO_2$ in the $SO_2$-containing gases to produce the corresponding metal sulfite, which in turn reacts with water and another mole of $SO_2$ to yield the corresponding metal bisulfite. Using potassium carbonate for illustrative purposes, the following reactions are involved:

(20) $K_2CO_3 + SO_2 \rightarrow K_2SO_3 + (O_2$

(21) $K_2SO_3 + H_2O + SO_2 \rightarrow 2 KHSO_3$

The following examples will serve to better illustrate the invention.

EXAMPLE I

Flue gas from a coal-burning furnace, and having the following approximate composition, is sent to an $SO_2$ absorber column:

| | |
|---|---|
| Sulfur dioxide: | 0.3 mole % |
| Oxygen: | 3.4 mole % |
| Water vapor: | 6.0 mole % |
| Carbon dioxide: | 14.2 mole % |
| Nitrogen: | 76.1 mole % |
| Sulfur trioxide: | 0.0003 mole % |
| Fly ash: | 0.3 grain per cubic foot |

The flue gas is introduced to the absorber column at a temperature of about 300° F. and a flow rate of about 2,010 actual cubic feet per minute (ACFM).

Before entering the chemical absorption zone of the column, the flue gas is conducted through a scrubbing zone in the column wherein the gas is scrubbed with 0.1 gallon per minute (GPM) of water to first remove other contaminants such as entrained particulate solid components, e.g., the fly ash, and more water-soluble components than the $SO_2$, e.g., the $SO_3$. Spent scrubbing water containing the removed fly ash and $SO_3$ is separated from the scrubbed gas and removed from the column. The scrubbed gas exits the scrubbing zone substantially free of the contaminants and passes into the absorption zone at a temperature of about 255° F. and a humidity of about 8 mole percent, the increased water content having been acquired in the scrubbing operation.

In the absorption zone of the column the scrubbed gas is counter-currently contacted with an aqueous absorbing solution of potassium sulfite which enters the column at about 150° F., and at a feed rate of about 68 pounds per minute. The entering absorbing solution has the following approximate composition:

| | |
|---|---|
| $KHSO_3$ (calculated as $K_2S_2O_5$): | 19.3 wt. % |

| | |
|---|---|
| $K_2SO_3$: | 26.6 wt. % |
| $K_2SO_4$: | 2.6 wt. % |
| $H_2O$: | 51.5 wt. % |

The temperatures of the scrubbed flue gas and of the entering potassium sulfite solution are high enough to maintain within the absorption zone a temperature sufficient to react the $SO_2$ in the scrubbed gas with the potassium sulfite in the absorbing solution to produce additional potassium bisulfite. Also, the flue gas vaporizes a portion of the water from the aqueous absorbing solution to provide a relative humidity of about 70 percent for the flue gas exiting the absorbing column for release to the atmosphere. The absorption zone temperature is not, however, kept so high as to cause the potassium bisulfite in the absorbing solution to decompose.

The flue gas is removed from the absorption zone and conducted to a third zone of the column, a demisting zone, wherein it is finally scrubbed with a portion of the entering potassium sulfite absorbing solution in an amount sufficient to remove entrained droplets and at least a portion of the sulfur dioxide remaining in the gas. The portion of the absorbing solution used to demist the gas is, together with the material entrained therein and the $SO_2$ absorbed thereby, conducted to the absorption zone wherein it is combined with the portion of the absorbing solution employed therein.

A major portion, e.g., about 90 percent, of the $SO_2$ is removed, or stripped, from the scrubbed flue gas during its passage through the absorption and demisting zones. A spent absorbing solution is removed from the absorption zone at a temperature of about 135° F. It has the following approximate composition:

| | |
|---|---|
| $KHSO_3$ (calculated as $K_2S_2O_5$): | 23.7 wt. % |
| $K_2SO_3$: | 23.7 wt. % |
| $K_2SO_4$: | 2.7 wt. % |
| $H_2O$: | 49.9 wt. % |

The pH of the spent absorbing solution is controlled to between about 6.6 and 7.4 and the solution is then conducted to a closed vessel, serving as a crystallization zone, maintained at a pressure of about 0.5 to 4 psia (e.g., 1 psia) to vaporize sufficient water from the solution to supersaturate the solution and crystallize potassium bisulfite out of the solution in the form of potassium pyrosulfite. The total amount of water evaporated from the absorbing solution in the absorption and crystallization zones is at least about equal to the amount added to the system in the dissolving zone. The resultant slurry is removed from the crystallization zone at a temperature of about 104° F. and conducted to a filter drum to remove the potassium pyrosulfite crystals. The $SO_2$ partial pressure-lowering potassium salts, e.g., the potassium sulfite and potassium sulfate, remain in solution in the filtrate, which is recycled to the absorption zone. The pyrosulfite crystals have the following approximate composition:

| | |
|---|---|
| $K_2S_2O_5$: | 96.2 wt. % |
| $K_2SO_3$: | 1.9 wt. % |
| $K_2SO_4$: | 1.9 wt. % |

The pyrosulfite crystals are next filtered and mixed with bunker coal in a 1:1 weight ratio in a screw pug mill at ambient conditions. The coal, prior to the admixing, has been coked by heating at 1,300° F. for one-half hour. After thorough mixing, the coal-pyrosulfite mixture is conducted to a roaster where it is heated under ambient pressure to 1,560° F. The carbon dioxide- and sulfur dioxide-containing product vapors are driven off as overhead and a solid product mixture containing potassium sulfide, charcoal, and fly ash is removed as bottoms.

The solid product mixture is conducted to a mixing vessel wherein it is slurried under ambient conditions with twice its weight of water. Substantially all of the potassium sulfide dissolves in the water to provide a solution pH of about 13. The resultant slurry is then filtered to remove the excess carbon, elemental sulfur and other insolubles, and to recover the potassium sulfide-rich filtrate.

The carbon dioxide-containing treated flue gas from the $SO_2$ absorber is counter-current contacted with the aqueous potassium sulfide solution in a stripper column, the gases entering the bottom of the column at a temperature of about 300° F. and the solution entering the top at about 150°F. The potassium sulfide is thereby converted to potassium carbonate in approximately quantitative yields and hydrogen sulfide is removed in the overhead stream. Potassium carbonate is removed as an aqueous solution from the bottom of the stripper column and sent to the $SO_2$ absorption step where it is combined with the aqueous solution of potassium sulfite entering the absorber column.

The overhead from the stripper column, which, as stated, contains $H_2S$, is combined with the $SO_2$-containing overhead from the roaster and the combined stream is passed at a rate of about one cubic foot per second, per cubic foot of catalyst, through a fixed bed reactor containing activated alumina at a temperature of about 550° F. The elemental sulfur-containing gaseous effluent from the reactor is cooled in a condenser to about 400° F.; molten sulfur is recovered therefrom and either stored as such or cooled to a solid. The effluent gases from the condenser are sent to a burner to convert any remaining $H_2S$ therein to $SO_2$, and the latter is sent to the $SO_2$ absorber at the head of the process.

EXAMPLE II

Potassium pyrosulfite crystals as produced in Example I are fed into the top of a shaft furnace maintained at an internal temperature of about 1,560° F. and reformer gas is passed upwardly therethrough. Average residence time of the pyrosulfite therein is about 40 minutes. $CO_2$— and $SO_2$—containing product gases are recovered in the overhead and molten potassium sulfide is recovered as bottoms from the furnace. The bottoms are dissolved in twice their weight of water and the resulting solution treated with $CO_2$ as in Example I to recover an aqueous solution of potassium carbonate and a gaseous overhead of $H_2S$. The potassium carbonate solution is recycled to the process as in Example I, and the $H_2S$ and $SO_2$ are converted to elemental sulfur and water via the Claus reaction as in the preceding example.

EXAMPLE III

Employing the procedure of Example I, an aqueous solution of cesium sulfite is used to absorb $SO_2$ from flue gas, providing a spent absorbing solution of cesium bisulfite, which is then recovered from the spent absorbing solution in the form of cesium pyrosulfite. The cesium pyrosulfite is reduced with coked bunker coal, and the product gases and the cesium sulfide obtained from the reduction roaster are further treated, all as in Example I.

EXAMPLE IV

Employing the procedure of Example I, an aqueous solution of rubidium sulfite is used to absorb $SO_2$ from flue gas, providing a spent absorbing solution of rubidium bisulfite, which is then recovered from the spent absorbing solution in the form of rubidium pyrosulfite. The rubidium pyrosulfite is reduced with coked bunker coal, and the product gases and the rubidium sulfide obtained from the reduction roaster are further treated, all as in Example I.

EXAMPLE V

Potassium pyrosulfite crystals as produced in Example I are fed into the top of a shaft furnace maintained at an internal temperature of about 1,560° F. and hydrogen sulfide gas is passed upwardly therethrough. Average residence time of the pyrosulfite therein is about 40 minutes. $SO_2$-containing product gases are recovered in the overhead and molten potassium sulfide is recovered as bottoms from the furnace. The bottoms are dissolved in twice their weight of water and the resulting solution is counter-currently contacted in a stripper column with gaseous $CO_2$ supplied from as external source, the $CO_2$ entering the bottom of the column at a temperature of about 300° F. and the solution entering the top at about 150° F. The potassium carbonate-containing bottoms from the stripper column are recycled to the process as in Example I. The $H_2S$-containing overhead gases from the column are combined with the $SO_2$-containing overhead gases from the reduction furnace and further treated as in Example I to provide elemental sulfur.

EXAMPLE VI

Tests were made under varying conditions in each of which 10 grams of anhydrous potassium pyrosulfite (containing approximately 5.6 wt. percent $K_2SO_4$) was mixed with 3 grams of minus 30 mesh charcoal. The mixtures were placed in small, covered porcelain crucibles and heated in a furnace at temperatures ranging from about 1,200° to 1,560° F.

The data obtained in this series of tests is presented in the table to follow. Analyses of the crucible products, i.e., the solids material remaining in the crucibles after the heating, were conducted as follows:

To a first portion of the crucible product there was added hydrochloric acid. The resultant mixture was filtered and the filtrate was boiled almost to dryness. The residue was then dissolved in water and to the resultant solution was added a 10 wt. percent aqueous solution of barium chloride. A precipitate of barium sulfate formed; it was separated from its mother liquor, dried and weighed. From the weight of the precipitate was calculated the percent of potassium sulfate in the crucible product, based on the weight of potassium pyrosulfite present in the reactant mixture.

To the remaining portion of the crucible product there was added 150 ml. of water. The resultant mixture was allowed to settle and the aqueous solution was decanted. The pH of a sample of the decanted liquid was determined and is reported in the following table. An aliquot portion of the liquid was then titrated with standard iodine solution (0.15 N) to determine the amount of oxidizable solute therein. (Potassium sulfide is oxidized by iodine, whereas potassium sulfate is not). From the titration data was calculated the iodine number of the liquid; it is reported in the following table as the milliliters of a 1 N iodine solution which would be required to titrate the entire crucible product. Therefore, the higher iodine number indicates the more complete conversion of the potassium pyrosulfite to potassium sulfide as a result of the heating.

That portion of the crucible product which was undissolved by the hydrochloric acid and that portion thereof which was undissolved by the water were both essentially composed of unreacted charcoal. The two portions were combined, filtered on a sintered glass filter, dried at 110° C., and weighed. The results are reported in the following table as the amount of carbon loss in grams.

TABLE I

| temp. °F. | time, min. | total weight loss, gms. | carbon loss, gms. | $K_2SO_4$ present, wt. % | iodine No. | final pH 1% | product Form* |
|---|---|---|---|---|---|---|---|
| 1200 | 60 | 3.1 | 0.6 | 75.5 | 10.2 | 12.5 | S |
| 1380 | 64 | 4.6 | 1.5 | 40.4 | 23.0 | 12.8 | S |
| 1470 | 64 | 5.5 | 1.7 | 3.0 | 79.5 | 12.8 | M |
| 1560 | 20 | 5.5 | 2.2 | 4.9 | 62.5 | 12.6 | M |

*Refers to the physical form of the crucible contents at the reaction temperature. S = sintered; M = molten.

In an additional run not shown in the foregoing table, reduction at 1,560° F. for 40 minutes resulted in complete reduction of all of the potassium to potassium sulfide, that is, potassium sulfate residue was nil. The above data demonstrate that chemical reduction of potassium pyrosulfite to potassium sulfide and $SO_2$ is especially efficient when reduction zone temperatures of upwards of about 1,400° F., or, most advantageously, at least about 1,560° F., are employed.

EXAMPLE VII

Tests were made under varying conditions, in each of which approximately 10 grams of anhydrous potassium pyrosulfite was subjected to reduction by a flowing hydrogen stream while the pyrosulfite was contained in a porcelain boat positioned in a closed "Vycor" tube. Product vapors were removed from the tube and passed sequentially through a condensation flask (to remove water and any elemental sulfur present), then through about 100 ml. of a first aqueous solution of about 2 grams of sodium bicarbonate, then through about 100 ml. of a second aqueous solution of about 2 grams of sodium hydroxide, and were then exhausted to a laboratory hood. The sodium bicarbonate solution absorbed $SO_2$ present in the vapors, allowing $H_2S$ to pass through and be absorbed in the sodium hydroxide solution.

Results of the various tests are reported in Table II as the amounts of potassium sulfate, potassium sulfide, $H_2S$, and $SO_2$ produced and the molar ratio of $H_2S$ to $SO_2$ produced. There is also reported the amount of potassium sulfate present in the pyrosulfite sample prior to its being subjected to the reduction zone temperatures.

TABLE II

| Run number | Conditions | Weight of $K_2S_2O_5$, gms. | $K_2SO_4$ content before redn., gms. | Products, gms. | | | | Mole ratio of $H_2S/SO_2$ |
|---|---|---|---|---|---|---|---|---|
| | | | | $K_2SO_4$ | $K_2S$ | $SO_2$ | $H_2S$ | |
| 1 | 1,560° F., wet $H_2$,* 30 min | 10.2 | 0.83 | 0.7 | 5.4 | 1.9 | 0.09 | 0.09 |
| 2 | 1,560° F., wet $H_2$, 45 min | 10 | 0.93 | 0.02 | 4.6 | 1.8 | 0.06 | 0.06 |
| 3 | 1,560° F., dry $H_2$, 45 min | 10 | 1.29 | 0.07 | 5.8 | 1.8 | 0.18 | 0.19 |
| 4 | 1,380–1,470° F., wet $H_2$, 7 hrs | 10 | 1.29 | 0.19 | 5.2 | 1.1 | 0.15 | 0.25 |
| 5 | 1,200–1,290° F., wet $H_2$, 7 hrs | 10 | 1.29 | 5.0 | nil | 1.0 | 0.04 | 0.1 |

*Hydrogen gas was first bubbled through water before being introduced to the reduction zone.

EXAMPLE VIII 110 parts by weight of petroleum coke is placed in a blender and there is then added thereto 3.5 parts of water and the coke-water mixture is blended thoroughly. Into that mixture is then blended 110 parts of dry potassium pyrosulfite obtained as in Example I. The resultant mixture is briquetted under a die pressure of about 1800 pounds per square inch guage. There is a small loss of $SO_2$ during the briquetting operation. The briquettes are quite hot when they leave the press and they emit $SO_2$ gas. The average analysis of the briquettes is as follows:

| | |
|---|---|
| $K_2S_2O_5$ | 33.1 weight percent |
| Coke | 49.9 weight percent |
| $K_2SO_4$ | 15.9 weight percent |
| $K_2S_2O_3$ | 1.0 weight percent |
| $H_2O$ | 1.3 weight percent |

The briquettes are then conducted to a roaster as used in Example I and heated under ambient pressure to 1700°–1,800° F. The product vapors from the roaster are rich in carbon oxides, contain practically no $SO_2$, and contain only a trace of $H_2S$ (about 108 to 216 parts per million). Potassium sulfide is produced in nearly quantitative yield.

The briquettes exit the roaster and are dumped into twice their weight of water and are disintegrated by agitation, thus forming a slurry of unreacted coke and ash in an aqueous solution of potassium sulfide. The slurry is filtered and the filtrate is treated in a stripper column as in Example I with $CO_2$—containing flue gas. Approximately one-third of the $H_2S$—containing overhead from the stripper column is sent to a burner wherein it is quantitatively oxidized to $SO_2$. The $SO_2$ so produced is combined with the remainder of the $H_2S$—containing overhead from the stripper column, and the combined stream is subjected to the Claus reaction in the manner described in Example I to yield elemental sulfur in an approximately quantitative yield.

It is claimed:

1. In a process for removing $SO_2$ from an $SO_2$—containing gas by contacting the gas with an aqueous absorbing solution comprising dissolved metal sulfite selected from the group consisting of potassium sulfite, cesium sulfite and rubidium sulfite at a temperature sufficient to have $SO_2$ in the gas convert said metal sulfite to the corresponding metal bisulfite and yield a spent absorbing solution which contains said bisulfite, and recovering bisulfite from said spent absorbing solution in the form of the corresponding metal pyrosulfite, the IMPROVEMENT wherein the metal pyrosulfite is treated to recover therefrom sulfur values which were absorbed from the $SO_2$—containing gas, by contacting the pyrosulfite with a reducing agent selected from the group consisting of carbon, carbon monoxide, hydrogen, hydrogen sulfide, and mixtures of the foregoing at about 1,200° to 1,800° F., recovering the metal sulfide produced by the reduction of the pyrosulfite, dissolving the metal sulfide in water to provide an essentially complete solution of said metal sulfide, thereafter contacting said aqueous solution of metal sulfide with carbon dioxide at about 100° to 225° F., to convert said metal sulfide, water, and carbon dioxide to the corresponding metal carbonate and hydrogen sulfide, recovering and recycling the resulting metal carbonate to the aqueous absorbing solution used to contact the $SO_2$—containing gas, reacting the resulting hydrogen sulfide with $SO_2$ to produce elemental sulfur and water, and recovering the resulting elemental sulfur.

2. The improvement of claim 1 wherein carbon is employed as reducing agent.

3. The improvement of claim 1 wherein carbon monoxide is employed as reducing agent.

4. The improvement of claim 1 wherein hydrogen is employed as reducing agent.

5. The improvement of claim 1 wherein the metal is potassium, a mixture of carbon monoxide and hydrogen is employed as reducing agent, and the reduction is conducted at about 1,400° to 1,650° F. to produce sulfur dioxide as well as the sulfide.

6. The improvement of claim 1 wherein the metal is potassium, coal or coke is employed as reducing agent in amounts of about 0.5 to 2 parts of coal per part by weight of the pyrosulfite, and the reduction is carried out at about 1,700° to 1,800° F.

7. The improvement of claim 2 wherein the reduction is conducted at about 1,700° to 1,800° F.

8. The improvement of claim 3 wherein the $SO_2$ which is reacted with the $H_2S$ is $SO_2$ obtained as a product of the reduction reaction.

9. The improvement of claim 4 wherein the $SO_2$ which is reacted with the $H_2S$ is $SO_2$ obtained as a product of the reduction reaction.

10 The improvement of claim 5 wherein the $SO_2$ which is reacted with the $H_2S$ is $SO_2$ obtained as a product of the reduction reaction.

11. The improvement of claim 10 wherein the mixture of carbon monoxide and hydrogen is reformer gas.

12. The improvement of claim 6 wherein petroleum coke is employed as reducing agent and, prior to being subjected to the reduction reaction, is formed into a briquetted mixture with the pyrosulfite by (a) thoroughly mixing the petroleum coke with water in an amount sufficient to provide about 1.5 to 3.5 percent water, based on the total weight of the coke-pyrosulfite-water mixture, the coke having a particle size of about 10 to 200 mesh (U. S. Seive Series), (b) adding the pyrosulfite, in a particle size of about 10 to 200 mesh (U. S. Seive Series), to the coke and water mixture, (c) thoroughly mixing the coke, water and pyrosulfite and (d) briquetting the resultant mixture.

* * * * *